United States Patent [19]

Holstrom

[11] Patent Number: 5,570,081
[45] Date of Patent: Oct. 29, 1996

[54] LOST ARTICLE TRACKING SYSTEM

[76] Inventor: Stephen L. Holstrom, 93490 Paruso Point, San Diego, Calif. 92129

[21] Appl. No.: 333,228

[22] Filed: Nov. 2, 1994

[51] Int. Cl.⁶ .................................................. G08B 23/00
[52] U.S. Cl. ............................ 340/573; 40/300; 40/330; 283/74
[58] Field of Search ................................. 340/573, 571, 340/691, 825.34; 364/516; 379/37; 235/487; 283/74–81; 40/299, 300, 330, 586, 625, 634

[56] References Cited

U.S. PATENT DOCUMENTS

| | | | |
|---|---|---|---|
| 3,094,799 | 6/1963 | Hines | 40/634 |
| 4,271,352 | 6/1981 | Thomas | 40/330 X |
| 4,650,219 | 3/1987 | Sigman | 283/74 X |
| 5,036,610 | 8/1991 | Fehr | 40/300 |
| 5,276,435 | 1/1994 | Rossides | 340/691 |

FOREIGN PATENT DOCUMENTS

| | | | |
|---|---|---|---|
| 225984 | 9/1989 | Japan | 283/81 |
| 158397 | 6/1990 | Japan | 283/75 |
| 2249773 | 5/1992 | United Kingdom | 40/625 |

*Primary Examiner*—Thomas Mullen

[57] ABSTRACT

An improved recovery system utilizing a two-piece detachable card. A base (10) and tag (12) are snapped apart at groove (16) into two separate pieces. Tag (12) is attached to an article such as a standard key ring via through-hole (14). Base (10) is retained in a secure place. If the article is lost a finder is asked to follow a specific course of action. Listed on the back of tag (12) is finder call number (22). The finder is prompted by the written words "If found, please call . . . " and a toll-free telephone number is listed. Upon calling the number from a touch-tone telephone, the finder is instructed to punch in tag number (20). The tones generated by punching in an activated tag number (20) cause a specific voice mail box to be created within computer (30). The finder is further instructed to leave a brief voice message providing a phone number or location where the "found" article can be recovered. Subsequently and upon discovering the loss of an article, the owner retrieves base (10) and calls owner call number (24). Upon connection to the computer (30), the owner is instructed to punch in base number (18). The tones generated by punching in base number (18) will cause computer (30) to automatically search and locate any voice messages in newly-created tag number (20) voice mail box. If a message is present the owner will hear it. If no messages have been recorded, the owner will be informed and asked to check back at a later time.

3 Claims, 2 Drawing Sheets

LOST ARTICLE TRACKING SYSTEM

BACKGROUND—FIELD OF INVENTION

This invention relates to key recovery systems, specifically an improved process of identifying, reporting and recovering lost articles.

BACKGROUND—DESCRIPTION OF PRIOR ART

Locks and keys are used to secure space or objects from unwarranted access. Possession of a set of keys is paramount in both accessing space and in keeping unauthorized persons from obtaining similar rights. Lost keys jeopardize security. Key owners realize the importance of maintaining possession of their keys, thus keys are grouped together and kept in close proximity at all times.

Key chains or key rings hold keys together for convenience and minimal protection against loss. However, a set of keys should not be labeled with the name, address or phone number of the owner due to the possibility of the keys falling into the hands of a person with criminal intent.

Inventors created "return postage guaranteed" key tag systems to help key owners recover lost keys. Their system works in the following manner. A person finds a lost set of keys with a key tag marked with an identification number and a "return postage guaranteed" national address. The finder then must deposit the found keys in any U.S. Post Office mailbox. Upon receiving a lost set of keys in the mail, the company offering the "return postage guaranteed" recovery system must search their database of registered key tag owners. If the owner is located, the keys are shipped to the listed address, which may or may not be current. If the address is not current, the keys are forwarded or shipped back to the national system address. Their system suffers from a number of disadvantages:

(a) Their system is expensive to produce and maintain. Vast databases must be constructed and vast amounts of data must be manually input, up-dated and maintained continuously—all at considerable expense. Postage must be paid by their system on both the incoming and out-going journey of lost keys.

(b) Their system requires each individual owner to pre-register the key tag with their system. Anonymity is sacrificed by creating a computer listing of the owner's name and address. Such pre-registration also requires a waiting period before the key tag is registered and therefore active within the system.

(c) Their system requires an extended time period between the loss of the keys and their return. Found keys are dropped in a mailbox, packaged by the local postal authorities and shipped to their national receiving location. At their national receiving center the key tag number is searched and located, the keys are packaged and shipped back to the owner. On average, this entire process takes anywhere between 7 to 21 days. By this time most owners have gone to the trouble and expense of making duplicate keys, re-keying locks, and/or cutting through padlocks.

SUMMARY OF THE INVENTION

Accordingly, several objects and advantages of the present invention are:

(a) to provide an inexpensive national recovery system. The present invention is highly economical to produce, distribute, and maintain.

(b) to provide a recovery system which requires no database pre-registration. The present invention is immediately usable.

(c) to provide a recovery system which provides total anonymity. The present invention doesn't require owners to register their tags, thus maintaining complete security.

(d) to provide a recovery system which requires no waiting period before activation. Upon receiving the present invention, the system is active and available to the owner.

(e) to provide a recovery system which can often reunite the owner and the missing article within hours of loss and thus spare the owner the high cost and inconvenience of replacing keys and/or re-keying locks.

Further objects and advantages of my invention will become apparent from a consideration of the drawings and ensuing description.

DRAWING FIGURES

REFERENCE NUMERALS IN DRAWINGS

| | |
|---|---|
| 10 base piece | 12 tag piece |
| 14 through-hole | 16 groove |
| 18 base number | 20 tag number |
| 22 finder call number | 24 owner call number |
| 26 set of keys | 28 finder telephone |
| 30 computer | 32 owner telephone |

DESCRIPTION OF THE PREFERRED EMBODIMENT

The present invention will utilize a unique combination of a two-piece detachable card, voice message technology and the telephone system to track lost personal articles and pets.

DESCRIPTION—FIGS. 1, 2, 3, 4

Figure 1:
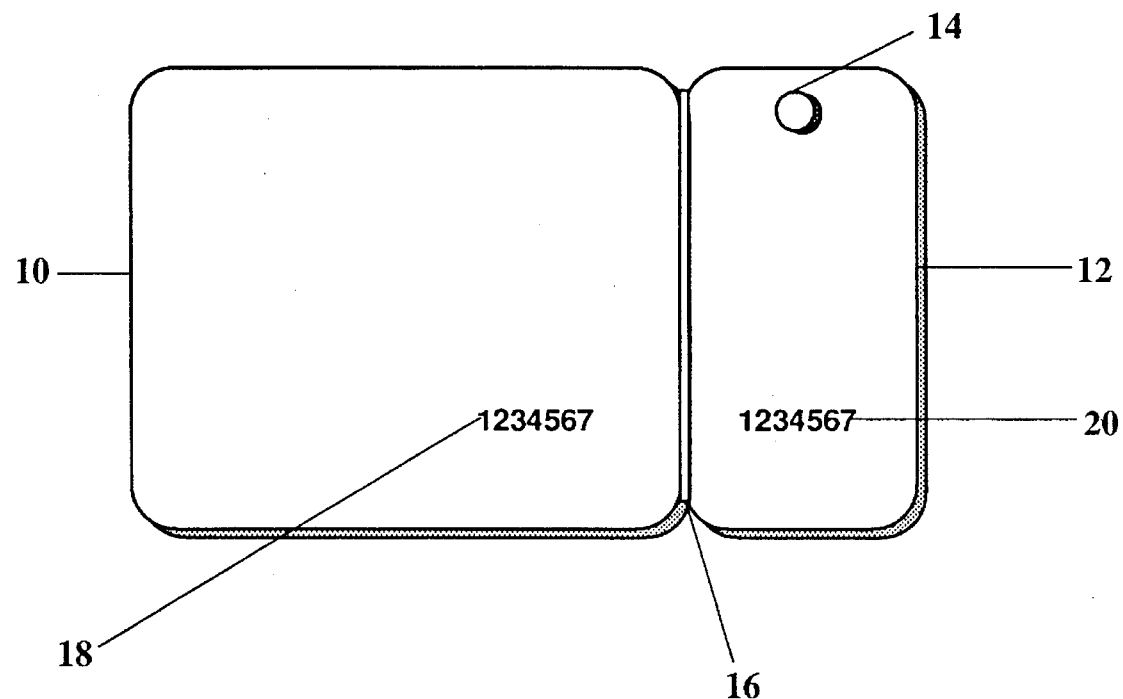
FIG. 1 shows a front view of the two-piece detachable card
Figure 2:
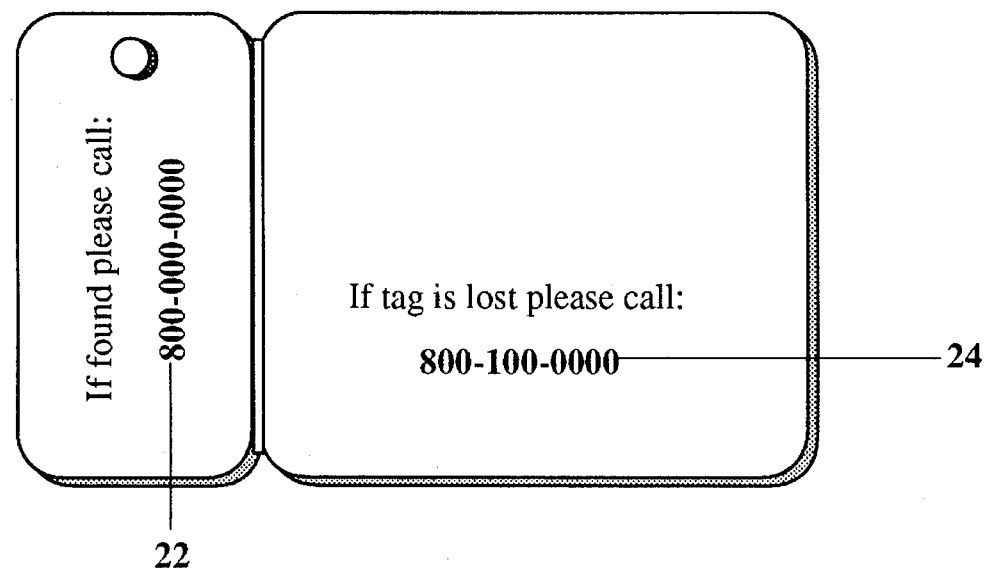
FIG. 2 shows a back view of the two-piece detachable card

A typical embodiment of the two-piece detachable card of the present invention is illustrated in FIG. 1 (front view) and FIG. 2 (back view). In the preferred embodiment, the two-piece detachable card is flexible plastic similar in scope to a standard credit card. However the invention can consist of other material such as rubber, wood, metal, cardboard, paper, etc.

Figure 3:
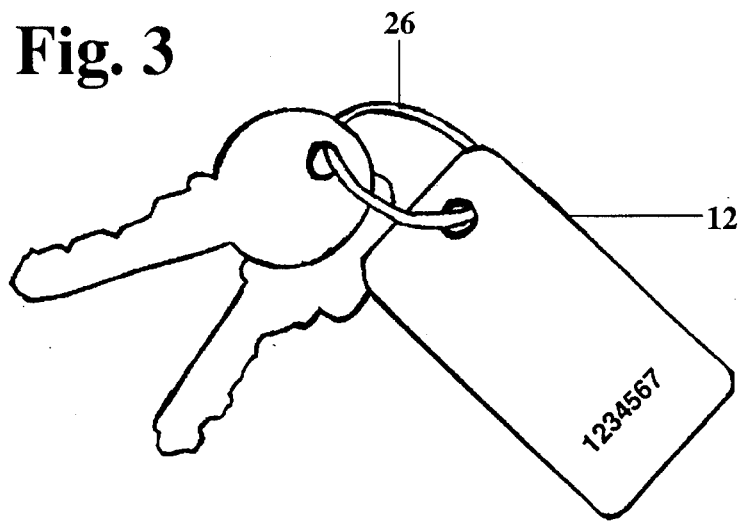
FIG. 3 shows tag piece attached to a set of keys

A base 10 and tag 12 is snapped apart at groove 16 into separate pieces. Tag 12 is attached to an article 26 via through-hole 14 in FIG. 3. Base 10 is retained in a secure place.

Figure 4:
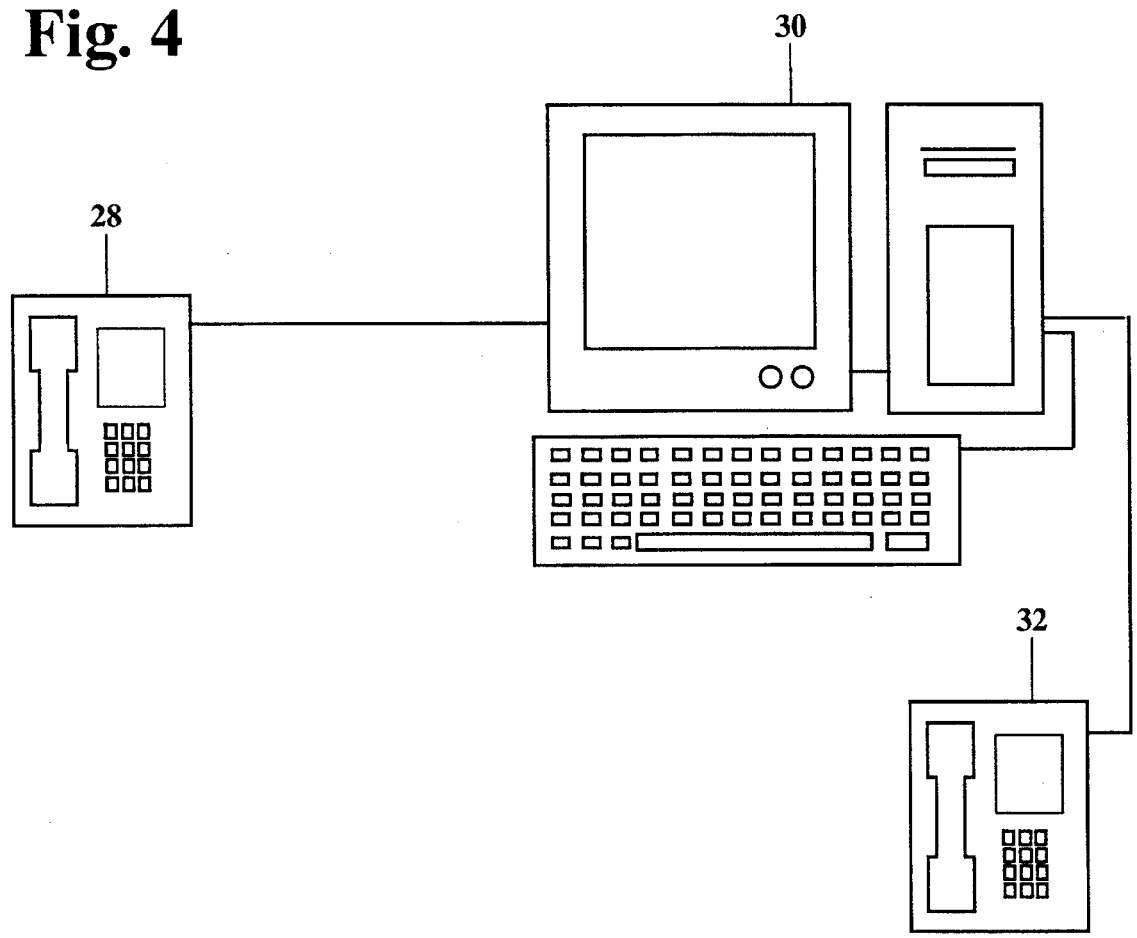
FIG. 4 illustrates components of the computer-generated voice mail box system

In FIG. 4, a finder of tag 12 telephonically 28 contacts computer 30 and is prompted to leave voice message. An owner with base 10 telephonically 32 contacts computer 30 to retrieve finder voice message.

OPERATION—FIGS. 1, 2, 3, 4

The manner of using the lost article tracking system to recover a lost set of keys is similar to that of "return postage guaranteed" key recovery systems in one respect. Namely, one must attach a specific tag to an article such as an existing set of keys.

The present invention requires the user to first separate the card into two pieces. Holding base 10, one bends tag 12 back and forth until the plastic card snaps into two pieces. Tag 12 is attached to an article such as a key ring via through-hole 14. Base 10 is placed in a secure place such as a wallet, purse, or desk drawer.

If an article such as a key ring is lost and subsequently found by someone other than the owner, the owner relies upon this person to follow a specific course of action. Listed on the back of tag 12 is finder call number 22. The finder is prompted by the written words "If found, please call" and a toll-free telephone number is listed. Upon calling the telephone number from a touch-tone telephone, the finder is instructed to punch in tag number 20. The tones generated by punching in an activated number cause a computer-generated voice mail box within computer 30 to be constructed. The finder is then instructed to leave a brief voice message providing a phone number or location where the article can be recovered.

The owner, upon discovering the loss of the article, retrieves base 10 and calls owner call number 24. Upon connection to the computer 30, the owner is instructed to punch in base number 18. The tones generated by punching in base number 18 will cause the computer 30 to automatically search and locate any voice messages in the voice mail box. Upon hearing the message the owner can retrieve the lost article. If no messages have been recorded, the owner will be informed and asked to check back at a later time.

SUMMARY, RAMIFICATIONS, AND SCOPE

Accordingly, the reader will see that the lost article tracking system can be used to reunite an owner with a lost article, such as a set of keys, easily with little loss of time or expense. The reader will also see that the invention provides a highly reliable, lightweight device that can be used by persons of almost any age. Furthermore, the lost article tracking system has additional advantages in that:

it provides a national recovery system which is highly economical to produce, distribute, and maintain;

it provides a recovery system which requires no database pre-registration and is immediately usable;

it provides a recovery system which provides total anonymity by not requiring the owners to register their tags;

it provides a recovery system which requires no waiting period before the system is activated and available to the owner.

Although the description above contains many specificities, these should not be construed as limiting the scope of the invention but as merely providing illustrations of some of the presently preferred embodiments of this invention. For example, the lost article tracking system can be applied to other objects and/or possessions such as pets, luggage, briefcases, cameras or camera cases, cellular phones, athletic equipment, etc.

Thus the scope of the invention should be determined by the appended claims and their legal equivalents, rather than the examples given.

I claim:

1. A method for an owner to track lost articles, comprising the steps of:

a. snapping apart a two-piece card to provide a tag piece and a base piece, with each piece having affixed thereto a common, predetermined identification number and a common, predetermined telephone number, b. attaching the tag piece to an article via a through-hole in the tag piece, the base piece being carried by the owner, c. affixing a message to the tag piece so as to prompt a finder of the article carrying the tag piece to telephonically call said predetermined telephone number, d. connecting said call to a computer-generated voice mail box system whereupon said finder is telephonically prompted to enter said predetermined identification number affixed to said tag piece, e. in response to said predetermined identification number being entered by said finder, telephonically prompting said finder to leave a voice message specifying a phone number or location where said finder can be reached so as to recover said article, f. connecting a telephonic call to said predetermined telephone number made by said owner to said computer-generated voice mail box system, and telephonically prompting said owner to enter said predetermined identification number affixed to said base piece, and g. in response to said predetermined identification number being entered by said owner, playing back said finder voice message if any such message is present.

2. A method for an owner to track lost keys, comprising the steps of:

a. snapping apart a two-piece card to provide a tag piece and a base piece, with each piece having affixed thereto a common, predetermined identification number and a common, predetermined telephone number, b. attaching the tag piece to a key ring via a through-hole in the tag piece, the base piece being carried by the owner, c. affixing a message to the tag piece so as to prompt a finder of the key ring carrying the tag piece to telephonically call said predetermined telephone number, d. connecting said call to a computer-generated voice mail box system whereupon said finder is telephonically prompted to enter said predetermined identification number affixed to said tag piece, e. in response to said predetermined identification number being entered by said finder, telephonically prompting said finder to leave a voice message specifying a phone number or location where said finder can be reached so as to recover said key ring, f. connecting a telephonic call to said predetermined telephone number made by said owner to said computer-generated voice mail box system, and telephonically prompting said owner to enter said predetermined identification number affixed to said base piece, and g. in response to said predetermined identification number being entered by said owner, playing back said finder voice message if any such message is present.

3. A method for an owner to track lost pets, comprising the steps of:

a. snapping apart a two-piece card to provide a tag piece and a base piece, with each piece having affixed thereto a common, predetermined identification number and a common, predetermined telephone number, b. attaching the tag piece to a pet via a through-hole in the tag piece, the base piece being carried by the owner, c. affixing a message to the tag piece so as to prompt a finder of the pet carrying the tag piece to telephonically call said predetermined telephone number, d. connecting said call to a computer-generated voice mail box system whereupon said finder is telephonically prompted to enter said predetermined identification number affixed to said tag piece, e. in response to said predetermined identification number being entered by said finder, telephonically prompting said finder to leave a voice message specifying a phone number or location where said finder can be reached so as to recover said pet, f. connecting a telephonic call to said predetermined telephone number made by said owner to said computer-generated voice mail box system, and telephonically prompting said owner to enter said predetermined identification number affixed to said base piece, and g. in response to said predetermined identification number being entered by said owner, playing back said finder voice message if any such message is present.

* * * * *